J. RICHARD & L. J. E. COLARDEAU.
STEREOSCOPIC CINEMATOGRAPH.
APPLICATION FILED JUNE 1, 1910.
1,209,498.
Patented Dec. 19, 1916.
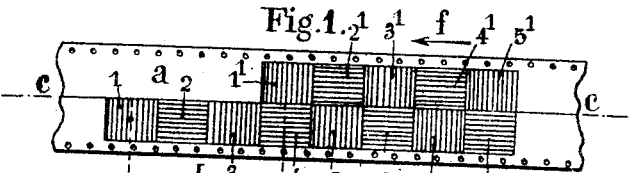
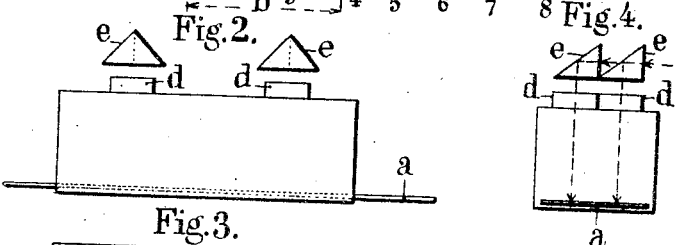
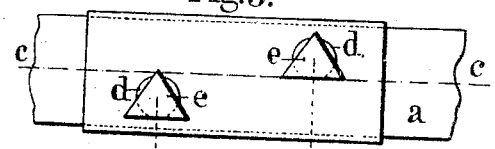
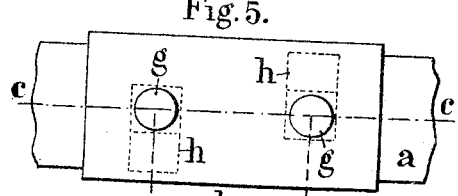
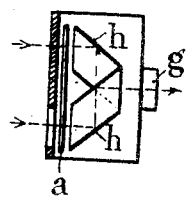
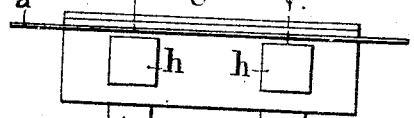
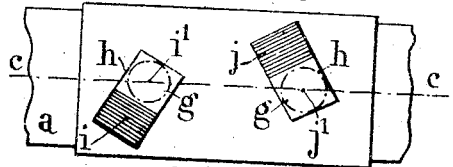
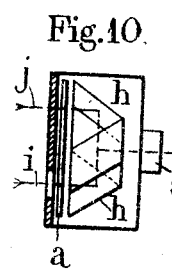
WITNESSES
J. P. Davis
A. E. Davis
INVENTORS
Jules Richard
Louis Joseph Emmanuel Colardeau
BY
Munn & Co
ATTORNEYS

UNITED STATES PATENT OFFICE.

JULES RICHARD AND LOUIS JOSEPH EMMANUEL COLARDEAU, OF PARIS, FRANCE.

STEREOSCOPIC CINEMATOGRAPH.

1,209,498.  Specification of Letters Patent.  Patented Dec. 19, 1916.

Application filed June 1, 1910. Serial No. 564,467.

*To all whom it may concern:*

Be it known that we, JULES RICHARD, of 25 Rue Mélingue, and LOUIS JOSEPH EMMANUEL COLARDEAU, of 13 Rue de Navarin, both in the city of Paris, Republic of France, have invented an Improved Stereoscopic Cinematograph, of which the following is a full, clear, and exact description.

This invention relates to an improved apparatus for obtaining animated stereoscopic views, and for permitting such views to be observed by one or several persons simultaneously.

The present invention comprises, in principle, the arrangement, on a single band or film, of two parallel rows of right and left hand stereoscopic images corresponding each to each, the two rows being displaced one with relation to the other in such a manner that the two corresponding images are placed at a distance apart equal to the normal distance of separation of the eyes, or at a distance apart nearly equal to the distance of separation. This band or film is moved horizontally past stereoscopic objectives provided with appropriate optical arrangements the function of which is to bring the two images in front of the eyes of an observer. The band can, in this manner, be caused to pass a series of similar pairs of objectives, in order that several observers can simultaneously observe the views. If the band is advanced at a sufficient speed the views, which appear in stereoscopic relief, appear to be animated.

The two rows or series of images can be obtained in several ways. For example, for this purpose, according to the present invention, a special apparatus can be employed provided with two tetrahedral prisms which give two properly adjusted images on the band itself.

The present invention moreover comprises a special apparatus suitable for the observation of the views when the band carrying the two series of images is passed therethrough. This apparatus comprises, in principle, two stereoscopic objectives combined with prisms arranged to bring the two images into alinement along a single line and, in the case in which the corresponding images are placed on the band at a distance apart different from the normal distance of separation of the eyes, the said prisms are arranged to correct this difference, in such a manner that two corresponding right and left hand stereoscopic images are always opposite to the two eyes of each observer.

The invention is illustrated, by way of example, in the accompanying drawing, in which:

Figure 1 shows a band carrying two rows or series of images. Figs. 2, 3 and 4 show in elevation, plan and side view, respectively, an apparatus for photographing the images directly on the band itself. Figs. 5, 6 and 7 show in elevation, plan and side view, respectively, an apparatus for observing the views. Figs. 8, 9 and 10 show in elevation, plan and vertical section, respectively, a modified form of apparatus for observing the views.

As shown in Fig. 1 of this drawing, and as has been hereinabove stated, the band $a$, comprised in the present invention, carries two series of images 1, 2, 3, 4 and 1', 2', 3' and 4', etc.; the images 1 and 1', 2 and 2', etc., are the corresponding left and right hand stereoscopic images. These images are separated one from the other at a distance $b$ which may be equal to the normal distance of separation of the eyes, or any other convenient distance.

It will be readily understood that, if the band $a$ is moved in the direction of the arrow $f$ past two objectives respectively corresponding to the right and left eyes of an observer, these objectives being provided with an appropriate optical arrangement capable of bringing the centers of the two corresponding images on the median line $c-c$ of the band, at a distance apart equal to the normal distance of separation of the eyes if the distance between the images is different from this distance, the observer looking into the two objectives will see the two corresponding stereoscopic images simultaneously and the component parts of the view will appear in relief and animated. The displacement of the band $a$ results in a rapid substitution for one image of successive images taken successively at short intervals of time, as is done in a cinematograph apparatus, in such a manner that the observer receives an impression of an animated stereoscopic view. It will be understood also that a series of objectives may be provided in front of the band; and while one observer sees the images numbered, for example, $n$ and $n^1$, the next observer will see the images numbered, for example, $n+8$ and $(n+8)^1$.

Different observers do not see the same images exactly at the same time but, as the images are taken at closely following times, the difference is practically not appreciable.

Before describing the apparatus by means of which the band $a$ may be observed, the manner in which the said band is obtained will be first indicated. The band or film $a$ can be obtained by a direct method in which the images 1 and 1', 2 and 2', are printed or photographed directly on the band $a$ at the required places indicated in Fig. 1. This operation can be carried out by the aid of apparatus, illustrated in Figs. 2, 3 and 4, which is provided with two stereoscopic objectives $d$ placed apart at a distance $b$ which preferably equals the normal distance of separation of the eyes, and on either side respectively of the line $c$—$c$ along the band $a$ passing through the apparatus, in such a manner that the optical axes are opposite to the places which the centers of the two corresponding images 1, 1', 2, 2', etc., on the band $a$, are required to occupy.

In order that the images shall not be inverted on the band, the apparatus is provided with two tetrahedral prisms the object of which is to produce a double effect of vertical and lateral inversion on the rays which they receive, thus compensating for the inversion produced by the objectives themselves in such a manner that the images are photographed or taken on the band $a$ at their appropriate places without inversion. In this apparatus the band $a$ is advanced horizontally and quite flat.

By combining with the objectives of this apparatus, an arrangement of prisms analogous to that hereinafter described with respect to the apparatus by means of which the band is observed, images can be registered on the band $a$ at a distance less than the normal distance of separation of the eyes.

One can also photograph or print the images on the band with this apparatus by removing the prisms $e$ and then turning the apparatus through an angle of 90°; the objectives $d$ will then receive rays directly from the objects in the respective fields of vision.

Figs. 5, 6 and 7 show an apparatus for examining the views in cases in which the corresponding images are arranged on the band at a distance apart of 63 m/m. This apparatus is, in this instance, provided with two objectives $g$ at a distance of 63 m/m. from one another; between these objectives and the band $a$ are placed parallelepipedon prisms $h$ giving a double total reflection which brings the centers of the corresponding images onto the line $c$—$c$. The band $a$ passes through the apparatus horizontally and turned up on edge.

Figs. 8, 9 and 10 show a modified arrangement in which the prisms are inclined as shown. In this case the rays $i$, $j$ proceeding from the centers of the two images carried by the band are brought by the prisms into the median plane the projection of which is indicated at $c$—$c$; at the same time, these prisms produce a lateral displacement of the two central rays or sets of rays; the said displacements being equal and in the same direction, the two rays finally arrive in the line $c$—$c$ at a distance of 63 m/m. apart, at $i'$ and $j'$ respectively. It is then only necessary to so arrange the objectives that their optical axes are at $i'$ and $j'$, in order to be able to observe the images.

The apparatus for taking the views, for example the apparatus illustrated in Figs. 2, 3 and 4, without the prisms $e$ there shown, may be used for the examination of views, the band being passed through the apparatus either on edge or laid down flat. This arrangement permits views to be taken or photographed directly on bands of paper which are converted, by known processes, into positives which can then be afterward observed.

The methods and apparatus for taking and reproducing views which are hereinabove described are only given by way of example; the present improvements are applicable to other methods or apparatus permitting a band to be taken or photographed and observed as hereinabove set forth. The forms, dimensions and detailed arrangements of the apparatus, and details of the application of the process can be varied according to circumstances without departing from the nature of the said invention, according to which a band or film carrying two parallel rows of stereoscopic images in which the corresponding images are not in alinement with each other, is moved past suitable objectives to give the effect of an animated stereoscopic picture or view, the said band being obtained, for example, in a direct manner by means of an apparatus provided with tetrahedral prisms insuring the normal alinement of the images, and the images thus obtained being observed by means of an apparatus provided with prisms which bring the centers of the images on to the optical axes of the objectives.

Claims:

1. In an apparatus for obtaining stereoscopic views by direct vision, the combination with a horizontal band carrying two parallel rows of stereoscopic images taken in pairs in which the right and left hand images of the same pair are displaced, of two objectives, and means for bringing back the images of the same pair opposite the axis of the objectives.

2. In an apparatus for obtaining stereoscopic views by direct vision, the combination with a horizontal band carrying two parallel rows of stereoscopic images taken in pairs in which the right and left hand images of the same pair are displaced, of two objectives, and prisms having the shape of straight parallelepipedons with a parallelogram base for bringing back the images of the same pair opposite the axis of the objectives.

3. In an apparatus for obtaining stereoscopic views by direct vision, the combination with a horizontal band carrying two parallel rows of stereoscopic images taken in pairs in which the right and left hand images of the same pair are displaced, of two objectives, and prisms having the shape of straight parallelepipedons with a parallelogram base and inclined with regard to one another for bringing back the images of the same pair opposite the axis of the objectives.

4. In an apparatus for obtaining stereoscopic views by direct vision, the combination with the band mounted to move longitudinally and provided with a plurality of series or rows of stereoscopic images, the images of one series being above the central line of the band and the images of the other series being below the central line of the band, the images of the upper series corresponding to the images of the lower series, the images of one series being spaced apart from the corresponding images of the other series a distance corresponding approximately to the normal distance between the eyes, of a pair of objectives arranged at the central line of the band and spaced apart laterally from each other a distance corresponding to the distance between corresponding images of the two series, and means between each objective and the adjacent series of images for bringing the said images opposite the axis of the objective, each of the said means comprising a prism having the shape of a straight parallelepipedon with a parallelogram base, the prisms being inclined with respect to each other for the purpose specified.

5. In an apparatus for obtaining stereoscopic views by direct vision, the combination with the band mounted to move longitudinally and provided with a plurality of series of rows of stereoscopic images, the images of one series being above the central line of the band and the images of the other series being below the central line of the band, the images of the upper series corresponding to the images of the lower series, the images of one series being spaced apart from the corresponding images of the other series a distance corresponding approximately to the normal distance between the eyes, of a pair of objectives arranged at the central line of the band and spaced apart laterally from each other a distance corresponding to the distance between corresponding images of the two series, and means between each objective and the adjacent series of images for bringing the said images opposite the axis of the objective, each of the said means comprising a prism having the shape of a straight parallelepipedon with a parallelogram base.

6. In an apparatus for obtaining stereoscopic views by direct vision, the combination with the band mounted to move longitudinally and provided with a plurality of series or rows of stereoscopic images, the images of one series being above the central line of the band and the images of the other series being below the central line of the band, the images of the upper series corresponding to the images of the lower series, the images of one series being spaced apart from the corresponding images of the other series a distance corresponding approximately to the normal distance between the eyes, of a pair of objectives arranged at the central line of the band and spaced apart laterally from each other a distance corresponding to the distance between corresponding images of the two series, and means between each objective and the adjacent series of images for bringing the said images opposite the axis of the objective.

The foregoing specification of our improved process and apparatus for obtaining and observing animated stereoscopic views, signed by us this 20th day of May, 1910.

JULES RICHARD.
LOUIS JOSEPH EMMANUEL COLARDEAU.

Witnesses:
H. C. COXE,
R. EHIRIOT.